（12）United States Patent
Gusat et al.

(10) Patent No.: US 9,294,385 B2
(45) Date of Patent: Mar. 22, 2016

(54) DEADLOCK-FREE ROUTING IN FAT TREE NETWORKS

(71) Applicant: International Business Machines Corporation, Armonk, NY (US)

(72) Inventors: Mircea Gusat, Langnau (CH); Cyriel J Minkenberg, Gutenswil (CH); German Rodriguez Herrera, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 14/194,861

(22) Filed: Mar. 3, 2014

(65) Prior Publication Data

US 2015/0249590 A1    Sep. 3, 2015

(51) Int. Cl.
*H04L 12/733* (2013.01)
*H04L 12/753* (2013.01)

(52) U.S. Cl.
CPC .............. *H04L 45/122* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 2003/0142627 A1* | 7/2003 | Chiu ....................... | H04L 45/00 370/238 |
| 2012/0044837 A1* | 2/2012 | Ibanez Fernandez et al. ....................... | H04L 45/02 370/256 |
| 2013/0114620 A1* | 5/2013 | Bogdanski .............. | H04L 45/48 370/408 |
| 2013/0121149 A1* | 5/2013 | Guay et al. .................... | 370/231 |

FOREIGN PATENT DOCUMENTS

WO    WO 2011084774 A2    7/2011

OTHER PUBLICATIONS

Bogdanski et al, "vFtree—A Fat-tree ROuting Algorithm using Virtual Lanes to Alleviate Congestion", Proceedings of the 25th IEEE IPDPS, May 16-20, 2011, pp. 197-208.
Bogdanski et al, "sFTree: A Fully Connected and Deadlock-Free Switch-to-Switch Routing Algorithm for Fat-Trees", ACM Transaction on Architecture & Code optimization, Jan. 2012.
Domke et al, "Deadlock-Free Oblivious Routing for Arbitrary Topologies", 2011 IEEE International Parallel & Distributed Processing Symposium (IPDPS), 2011, pp. 617-627.
Flich et al, "Improving InfiniBand Routing through Multiple Virtual Networks", Proceedings of the 4th ISHPC, 2002, vol. 2327, pp. 49-63.
Sancho et al, "Effective Methodology for Deadlock-Free Minimal Routing in InfiniBand Networks", Proceedings of the ICPP, 2002, pp. 409-418.

* cited by examiner

*Primary Examiner* — Kerri Rose
(74) *Attorney, Agent, or Firm* — Jeff Tang (57) ABSTRACT

Methods and apparatus are provided for routing data packets between source and destination switches in a fat tree network. For each packet, a route is selected having three or less routing phases such that the route follows a shortest path across the network between the source and destination switches. The data packet is transmitted from the source switch to the destination switch, via the route, on one of first and second virtual channels unless the route includes a predetermined one of a down-up turn and an up-down turn. If the route includes the predetermined one of a down-up turn and an up-down turn, the data packet is transmitted, via the route, on the first virtual channel up to the switch 1 at which the turn occurs and on the second virtual channel from that switch. This provides full-connectivity in fat tree networks with deadlock free operation.

27 Claims, 7 Drawing Sheets

Level           Binary 4-tree

DEADLOCK-FREE ROUTING IN FAT TREE NETWORKS

BACKGROUND OF THE INVENTION

1. Field of the Invention

This invention relates generally to deadlock-free routing in fat tree networks.

2. Description of Related Art

Figure 1:
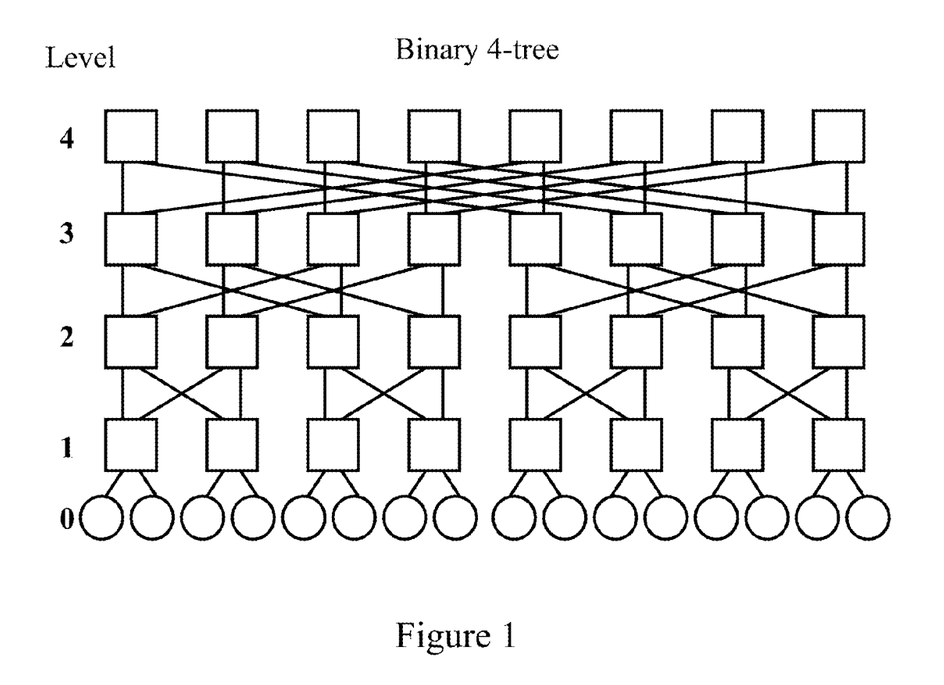
FIG. 1 shows an exemplary fat tree network topology.

Fat tree networks are hierarchical, recursively constructed networks comprising multiple switches connected in a multi-rooted tree-like topology. These networks enjoy widespread popularity and are used in many modern-day high-performance computing systems and commercial data center installations. There are a number of variations of the fat tree topology, but the basic principles of these networks can be understood from FIG. 1 of the accompanying drawings. This shows an example of a specific, highly regular fat tree network known as a "k-ary n-tree". In this designation, k is the radix of the tree (i.e., the number of children and/or parents at each level), and n is the number of levels. A k-ary n-tree has n levels of switches, each switch having radix 2k, with half of the ports connecting downwards and the other half connecting upwards. The switches in the top level (i.e., the roots of the tree) in principle only require radix k as they have no parents, but in practice these ports may be present and unconnected to allow for future network extensions. The network of FIG. 1 is a binary 4-tree, whereby k=2 and n=4, with the squares representing switches and the lines between them representing inter-switch links. The switches form an interconnection network of an indirect network topology, i.e. the end nodes (compute nodes, servers, etc.) are connected at the edges of the network, providing a clear distinction between compute and networking. The end nodes in FIG. 1 are represented by circles and connect to the bottom layer of switches, i.e. the leaves of the tree topology.

Packets can be transmitted between any pair of end nodes in fat tree networks via a simple routing procedure involving two routing phases. The first routing phase is an "up phase", in which the route follows one or more switch-to-switch hops in the upwards direction (i.e. towards the roots) of the topology. This is followed by a "down phase" in which the route follows one or more switch-to-switch hops in the downwards direction of the topology. With this routing strategy, shortest-path routing is straightforward and, because routes include only up/down turns and not down/up turns, deadlock is avoided. Deadlock can occur if there are cyclic dependencies between resources in the channel dependency graph as this can result in irreconcilable conflict between resource requests in operation of the network. There are also multiple, equal-length paths between any source and destination (not attached to the same leaf switch), enabling multi-pathing and load-balancing in network operation. Fat tree networks also offer high bisection-bandwidth, and the hierarchical structure is readily scalable to very large networks.

Due to the indirect nature of fat tree networks, routing algorithms for these networks only deal with traffic that flows from one end node to another and do not provide connectivity from any switch to any other switch in the network. Full switch-to-switch connectivity would require use of routes with down/up turns and these turns can introduce deadlock in the network, which must be avoided at all costs. However, direct switch-to-switch connectivity can be highly beneficial for several network management functions, such as communicating topology changes (addition or removal of nodes and/or switches), distribution of local fault events (e.g. breaking of a link), and diagnostics (measuring latency or throughput in between an arbitrary switch pair). Also, current InfiniBand switches often have an embedded subnet manager which needs connectivity with all switches in the network. (InfiniBand is a trade mark of the InfiniBand Trade Association).

A proposal for full connectivity in fat tree networks is described in "sFtree: A fully connected and deadlock-free switch-to-switch routing algorithm for fat-trees", Bogdanski et al., ACM Trans. Architecture and Code Optimization, vol. 8, no. 4, January 2012. This proposal designates a particular inverted sub-tree, within the overall indirect network topology, in which down/up turns can occur during routing. If conventional two-phase up-down routing does not provide connectivity between a source and destination switch, then a four-phase up-down-up-down route is used, with the down/up turn occurring in the designated sub-tree. This provides deadlock-free routing by route restriction to avoid hardware modifications such as use of virtual channels which the authors deem undesirable for these networks. The proposed routing method is neither shortest path, nor does it fully exploit path diversity. Moreover, because it concentrates switch-to-switch traffic in one inverted sub-tree, the network it is prone to congestive effects and loss of connectivity due to network faults.

Various mechanisms are known for deadlock avoidance in networks in general, including use of virtual channels (i.e. partitioning of resources such as switch buffers and links to provide plural logical channels within one physical channel), and flow control mechanisms such as injection restriction to prevent any single resource from stopping transit. Use of virtual channels for deadlock avoidance in an arbitrary node-to-node network topology is discussed in "Deadlock-free Oblivious Routing for Arbitrary Topologies", Domke et al., in Proceedings of the 25th IEEE International Parallel & Distributed Processing Symposium (IPDPS), Anchorage, USA, p. 613-624, May 2011. This proposes a complex system based on detailed analysis of the network topology. This and similar algorithms typically require two to twelve virtual channels to guarantee deadlock freedom. "Effective Methodology for Deadlock-Free Minimal Routing in InfiniBand Networks", Sancho et al., in Proc. IEEE International Conference on Parallel Processing (ICPP), Vancouver, Canada, p. 409-418, August 2002, discloses use of virtual channels and service levels for deadlock-free routing in InfiniBand networks. This requires complex network analysis involving minimal path computation and mapping to a spanning tree of the arbitrary topology, with virtual channels being allocated, if available, to break deadlock. These various techniques for arbitrary topologies lead to poor performance in fat tree networks because they fail to exploit the tree's multi-path capabilities.

SUMMARY OF THE INVENTION

The present invention provides a computer-implemented method for routing data packets between source and destination switches in a fat tree network. The method includes the steps of: selecting a route for each packet having three or less routing phases such that the route follows a shortest path across the network between the source and destination switches; transmitting the data packet from the source switch to the destination switch, via the route, on one of first and second virtual channels unless the route includes a predetermined one of a down-up turn and an up-down turn; and transmitting the data packet, via the route, on the first virtual channel up to the switch at which the turn occurs and on the second virtual channel from that switch, if the route includes the predetermined one of a down-up turn and an up-down turn.

The present invention also provides a computer-implemented method for determining routing of data packets between pairs of source and destination switches in a fat tree network. The method includes the steps of: selecting respective routes having three or less routing phases such that each route follows a shortest path across the network between the source and destination switches; assigning each route to one of first and second virtual channels from the source switch to the destination switch unless that route includes a predetermined one of a down-up turn and an up-down turn; and assigning the route to the first virtual channel up to the switch at which the turn occurs and to the second virtual channel from that switch, if a route includes the predetermined one of a down-up turn and an up-down turn.

BRIEF DESCRIPTION OF THE DRAWINGS

Preferred embodiments of the invention will now be described, by way of example, with reference to the accompanying drawings in which.

DETAILED DESCRIPTION OF THE PREFERRED EMBODIMENTS

One aspect of the present invention provides a method for routing data packets between source and destination switches in a fat tree network. The method comprises: selecting a route for each packet having three or less routing phases such that the route follows a shortest path across said network between the source and destination switches, i.e., the source switch and the destination switch for the selected route; transmitting the data packet from the source switch to the destination switch, via said route, on one of first and second virtual channels unless the route includes a predetermined one of a down-up turn and an up-down turn; and if the route includes said predetermined one of a down-up turn and an up-down turn, transmitting the data packet, via the route, on the first virtual channel up to the switch at which said turn occurs and on the second virtual channel from that switch. With routing methods embodying this invention, all routes have three or less routing phases. This allows six possible combinations of routing phases: up, down, up-down, down-up, up-down-up, and down-up-down. Any one of these six phase combinations can be used for routes, but, for any given route, the appropriate phase combination is used such that the route follows a shortest path (i.e. minimum number of inter-switch hops) between the source and destination in the overall network topology. Deadlock is avoided by using two virtual channels for routes which include a predetermined type of turn. In some embodiments this is a down-up turn. In others, it is an up-down turn. If the route selected for a data packet includes this particular type of turn, then the packet is transmitted on the first virtual channel from the source up to the switch at which this turn occurs (the "turning switch"), and on the second virtual channel from the turning switch to the destination. Other routes may use either virtual channel for the entire route from source to destination. This provides a simple yet highly efficient routing system providing full switch-to-switch connectivity in fat tree networks. No more than three routing phases are required for any route, the appropriate phase combination being used such that a shortest path route is always selected for any pair of source and destination switches. Deadlock avoidance is always guaranteed via the use of only two virtual channels, i.e. just one more channel than the essential physical channel. Contrary to the thinking of Bogdanski et al. referenced above, this simple, two-channel system offers significant performance advantages. Path diversity in the fat tree network can be fully exploited while achieving full, shortest path connectivity. Latency can be minimized while efficiency can be further enhanced by load-balancing over multiple paths. Moreover, both reliability and efficiency are improved by avoidance of path restrictions: the likelihood of congestive effects is reduced and fault tolerance is improved. Overall, therefore, routing methods embodying the invention offer simple, robust and highly efficient routing in fully-connected fat tree networks.

In preferred embodiments, said predetermined one of a down-up turn and an up-down turn is a down-up turn, whereby packets change from the first to the second virtual channel on routes which have a down/up turn. In particularly simple implementations, packets are transmitted on the first virtual channel for routes which do not include the predetermined turn. All packets are then transmitted initially on the first channel, changing to the second channel only on making a down/up (or alternatively up/down) turn.

Routing methods embodying the invention may include the step of calculating the routes for data packets. In general, routes could be calculated in advance for pairs of switches in the network topology and then selected as appropriate, or routes could be calculated dynamically as part of the route selection process. In addition, routes could be calculated in their entirety for use between a given source switch and a given destination switch, or routes could be calculated on a hop-by-hop basis for successive switches on a given route. In any case, preferred embodiments include calculating the route for a data packet by determining, for each switch on the route, the direction of the routing phase for the next hop and the next switch on the route in that direction. Then, for each switch on the route, the virtual channel for the next hop can be determined in dependence on said direction.

If routes are pre-calculated, e.g. offline in advance of network operation, routing methods embodying the invention may include selecting the route for a data packet using pre-determined routing data indicating pre-calculated routes between pairs of switches in the network. Such routing data may comprise one or more data structures, e.g. routing tables, for access by switches during network operation. Alternative embodiments include calculating the route for each data packet dynamically in operation of the network. Such dynamic route calculation might be performed, in general, for each packet individually or for sets of data packets, e.g. all packets in a given message. In preferred embodiments described below, dynamic route calculation is performed by calculating the route for each data packet on a hop-by-hop basis at successive switches in said path.

A second aspect of the invention provides a computer program comprising program code means for causing a processor of a switch in a fat tree network of like switches to perform, collectively with the other switches, a method according to the first aspect of the invention.

The assignment of virtual channels for packet transmission on given routes can be performed dynamically in operation, either on a hop-by-hop basis in each switch or at the source switch for a route. However, both route calculation and the assignment of routes to particular virtual channels could be performed in advance if desired, e.g. by a network management computer, prior to operation of the network. A third aspect of the invention therefore provides a computer-implemented method for determining routing of data packets between switches in a fat tree network, the method comprising: for routing between pairs of source and destination switches, selecting respective routes having three or less routing phases such that each route follows a shortest path across said network between the source and destination switches; assigning each route to one of first and second virtual channels from the source switch to the destination switch unless that route includes a predetermined one of a down-up turn and an up-down turn; and if a route includes said predetermined one of a down-up turn and an up-down turn, assigning the route to the first virtual channel up to the switch at which said turn occurs and to the second virtual channel from that switch.

Such a method may include providing routing data, indicating each said route and virtual channel assignment thereof, for use by switches in the network, e.g. as routing tables for access by switches during network operation.

A fourth aspect of the invention provides program code means for causing a computer to perform a method according to the third aspect of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

A fifth aspect of the invention provides a fat tree network comprising a plurality of switches connected in a fat tree topology, the switches being adapted to implement a routing method according to the first aspect of the invention. A further aspect of the invention provides a switch of a fat tree network according to the fifth aspect of the invention.

Like conventional fat tree networks, a fat tree network embodying the fifth aspect of the invention may be an indirect network. In this case, each switch in a lowest level of the fat tree topology can be connected to at least one end node. The full-connectivity enabled by the routing method can then be exploited for any required inter-switch communications, e.g. for network management functions. However, the switch-to-switch routing technique enables an extension of the conventional use of fat tree topologies. In particular, a fat tree network embodying the fifth aspect of the invention may be a direct network. In such a direct fat tree network, switches in a plurality of levels of the fat tree topology can each be connected to at least one end node. Hence each switch in the network can be connected to one or more end nodes.

In general, where features are described herein with reference to an embodiment of one aspect of the invention, corresponding features may be provided in embodiments of another aspect of the invention as appropriate.

Figure 2:
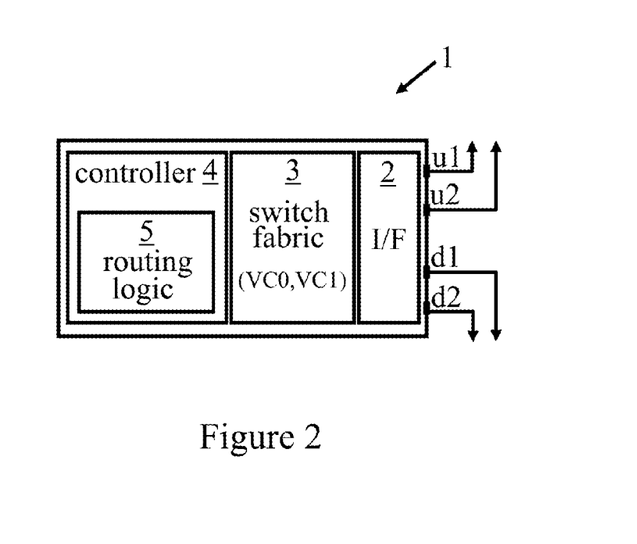
FIG. 2 is a schematic representation of a switch for use in routing methods embodying the invention.

FIG. 2 is a simplified schematic of a network switch 1 for implementing routing methods embodying the invention in a fat tree network. In this example, the switch 1 has four ports for connection in a binary fat tree topology like that of FIG. 1. The two upwardly-facing ports are labelled u1 and u2, and the two downwardly-facing ports are labelled d1 and d2. The switch includes the usual network interface circuitry (I/F) 2 for transmitting and receiving data packets via network links connected to the ports. Switch fabric 3 includes the usual buffers and connections via which a received packet traverses the switch between the input port and the appropriate output port for its route across the network. This process is controlled by a switch controller 4. The switch fabric 3 supports two virtual channels, designated VC0 and VC1, for transmission of data packets in the network. Hence, through logical partitioning of buffers, etc., under control of switch controller 4 in the usual way, the physical resources of the switch are partitioned to provide two logical channels on the same underlying hardware. The controller 4 controls operation of switch 1 generally, and includes routing logic 5 for implementing the routing functionality detailed below. The routing logic 5 could be implemented, in general, in hardware or software or a combination thereof. In some embodiments, therefore, the routing logic could be implemented by a processor (which may in general comprise one or more constituent processors) which is configured by software to perform the functions described, and suitable software will be apparent to those skilled in the art from the description herein. In the particular embodiment to be described, where route calculation is performed dynamically by switches 1 on a hop-by-hop basis, the routing logic 5 is preferably implemented in hardwired logic for speed of operation. Again, suitable implementations will be readily apparent to those skilled in the art.

Figure 3:
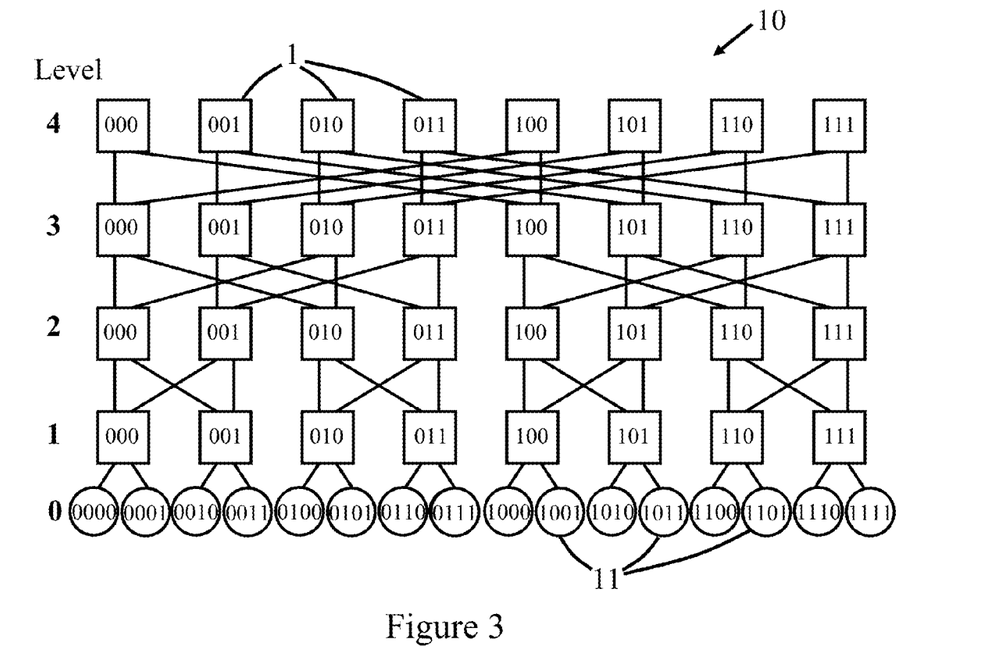
FIG. 3 illustrates switch designations in a fat tree network embodying the invention.

FIG. 3 shows a first example of a network embodying the invention. This network 10 is constructed from a plurality of like switches 1 connected in an indirect, binary 4-tree topology. Hence, network 10 has n=4 levels of switches, with radix k=2, forming an interconnection network between end nodes 11 which are connected to the leaf switches in the lowest level, level 1, of the switch hierarchy. The switches 1 are adapted to implement a routing method detailed below whereby data packets can be routed between any pair of switches in the network. Thus, routing can be performed for both node-to-node communications between end nodes 11 and also inter-switch communications between any two switches 1. Data packets for which routing is performed may therefore contain any type of data, whether data originating from end nodes, e.g. user data, and/or data originating from switches, e.g. control/management data. The routing method to be described is digit-based in this embodiment, with each switch 1 in the network being identified by its level and an (n−1)-digit base-k designation indicating the position of the switch in that level. In the example of FIG. 3 where n=4 and k=2, each switch is identified within its level by the 3-digit binary designation indicated in the figure. The two end nodes attached to each leaf switch can be identified by four bits as indicated, being the three-bit designation of the leaf switch and one additional bit.

To route data packets between any given pair of source and destination switches in network 10, the routing logic 5 of each switch 1 implements a routing algorithm detailed below whereby routes are calculated, and assigned to virtual channels VC0, VC1, dynamically on a hop-by-hop basis. In this embodiment, therefore, routes are selected and assigned to virtual channels via collective operation of successive switches on the route from a source to a destination switch. The main steps of the routing process implemented by each switch 1 are indicated in the flow diagram of FIG. 4. The process commences at step 20 when a data packet is to be routed to a particular destination switch. This packet may have been transmitted to the current switch from a previous switch on the route or generated locally at the current switch as the source switch. In step 21, the routing logic 5 first determines the appropriate direction (i.e. up or down) of the routing phase for the next hop on the route. Next, in step 22 the routing logic selects a particular parent or child switch in the chosen direction as the next switch on the route. As demonstrated below, steps 21 and 22 are performed in such a manner that the selected route will always follow a shortest path (minimum possible number of inter-switch hops) between the source and destination switches in the overall network topology. In step 23, the routing logic 5 then determines the virtual channel to be used for the next hop. The assignment of virtual channels here depends on the selected routing direction and is performed in accordance with principles explained below so as to avoid deadlock during network operation. In step 24, the packet is transmitted via the appropriate port to the next switch on the assigned virtual channel, and the process is complete.

The various steps of the FIG. 4 process are addressed in more detail in the following. Considering first the determination of routing direction in step 21, this step is performed in such a manner that routes can have any combination of three or less routing phases. Hence, all routes have one of the following phase combinations: up, down, up-down, down-up, up-down-up, and down-up-down. In performing step 21, the routing logic ensures that, for each route, the appropriate phase combination is used such that the route can follow a shortest path across the network.

Figure 4:
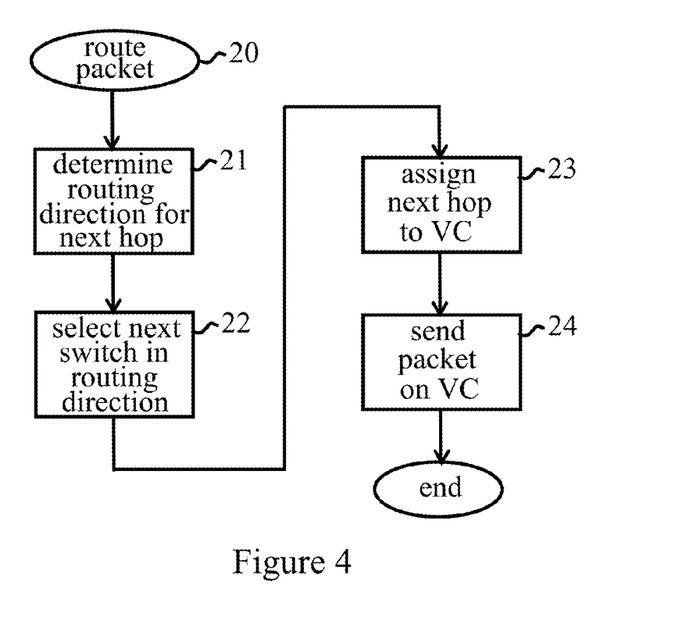
FIG. 4 indicates steps performed by switches implementing a routing method embodying the invention.

Step 22 of FIG. 4 selects a particular shortest path route in the required direction. In particular, the network topology is such that, for many pairs of source and destination switches, there is more than one shortest path route. In this case, a variety of path selection policies, which may be static or dynamic, can be employed to select a particular shortest path. Such policies are well known in the art and need not be discussed here. Suffice to say that the path diversity offered by the fat tree topology can be exploited as desired in a given scenario.

Step 23 of FIG. 4 ensures deadlock-free routing in operation of network 10. Deadlock is avoided by changing virtual channels on routes which include a predetermined type of turn. In the present embodiment this is a down-up turn. Specifically, if the route selected for a data packet includes a down-up turn, then the packet is transmitted on a first virtual channel, here VC0, from the source switch up to the switch at which the down-up turn occurs (the "turning switch"). The packet is then transmitted on the second virtual channel, here VC1, from the turning switch to the destination switch. Routes which do not include a down-up turn may use either virtual channel for the entire route from source to destination. In the present embodiment such routes use channel VC0, whereby all routes follow VC0 at least initially, with routes containing a down/up turn changing to VC1 at the turning switch. This policy for assigning routes to virtual channels guarantees deadlock-free operation by avoiding cyclic dependencies in the channel dependency graph.

An exemplary routing algorithm for implementation in routing logic 5 to perform the above steps is defined by the pseudo-code given below. In this code:

L(s) indicates the level of switch s, $1 \leq L(s) \leq n$; each switch is identified by an (n−1)-digit number, the digits being numbered from 1 to n−1, with digit 1 (rightmost) being the least significant, and digit n−1 (leftmost) being the most significant;

Di(s) indicates ith digit of switch s, $1 \leq Di(s) < k$, $1 \leq i \leq n-1$ c denotes current switch position;

d denotes destination switch position;

MSD(c, d)=most significant differing digit between c and d; and

LSD(c, d)=least significant differing digit between c and d

---

Step 21: Determine routing direction

```
if (c == d) then destination reached;  /* done */
else
    if (msd == − 1 and lsd == − 1) then  /* same digits but different
    level: 1-phase straight up or down */
        if (L(c) > L(d)) then dir = down; else dir = up; fi
    else
        if (L(c) <= lsd and lsd <= msd and msd < L(d)) then dir = up; /*
        1-phase up route */
        else
            if (L(c) > msd and msd >= lsd and lsd >= L(d)) then dir =
            down; /* 1-phase down route */
            else
                if (L(c) == 1 or L(c) <= lsd or L(d) <= lsd) then dir =
                up; /*2-phase up-down route */
                else
                    if (L(c) == n or L(c) > msd or L(d) > msd) then
                    dir = down; /* 2-phase down-up route */
                    else /* 3-phase down-up-down or up-down-up
                    route */
                        if (L(c) <= L(d)) then dir = down; else dir =
                        up; fi
                    fi
                fi
            fi
        fi
    fi
fi
```

---

It will be seen that the result of step 21 via this algorithm depends on the position of the destination switch relative to the current switch in the overall network topology. Selection of the initial routing direction at the source switch effectively selects the particular one of the six allowable phase combinations providing the shortest path as discussed above.

---

Step 22: Select next switch

```
if (dir == down) then
    /* If d is at an equal or higher level than c, pick any child.
    * Otherwise, pick the child according the corresponding digit. */
    if (L(d) >= L(c)) then
        child = pickAnyChild( ); /* can be via any static or dynamic
        policy */
    else
        child = DL(c) − 1(d);
    fi
else /* dir == up */
    /* If the d is at an equal or lower level, pick any parent.
    * Otherwise, pick the parent according the corresponding digit.
    */
    if (L(d) <= L(c)) then
        parent = pickAnyParent( ); /* can be via any static or dynamic
        policy */
    else
        parent = DL(c)(d);
    fi
fi
```

---

It will be seen that the result of step 22 via this algorithm depends on both the relative positions of the current and destination switches and the current routing direction.

Step 23: virtual channel assignment

```
/* Deadlock prevention:
 * Change the VC to 1 when changing direction from downwards to
upwards.
 * If VC was already 1, route stays on that VC, otherwise VC is 0. */
if (currentVC == 1 or (currentDir == down and dir == up)) then
    nextVC = 1;
else
    nextVC = 0;
fi
```

With the above algorithm, the destination switch for a given packet can be indicated in the packet by its level and 3-digit position designation shown in FIG. 3. The current virtual channel VC is indicated in the packet by a 1-bit flag. Current routing direction can be indicated in the packet or may be determined by a switch from the receiving port, i.e. whether the receiving port is upwardly or downwardly facing.

Figure 5:
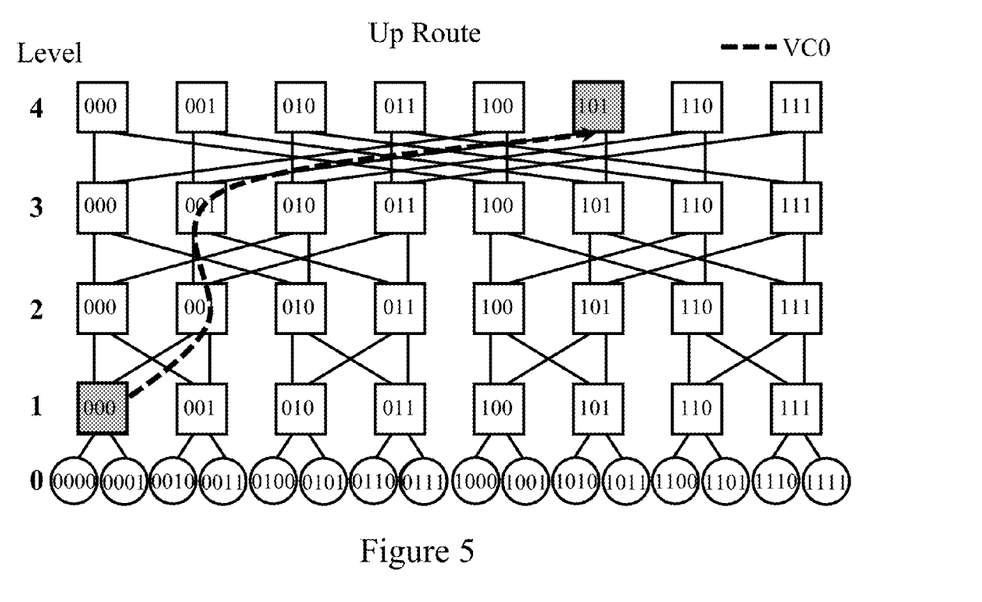
FIGS. 5 to 10 show exemplary routes with different combinations of routing phases obtained with the method of FIG. 4.
Figure 6:
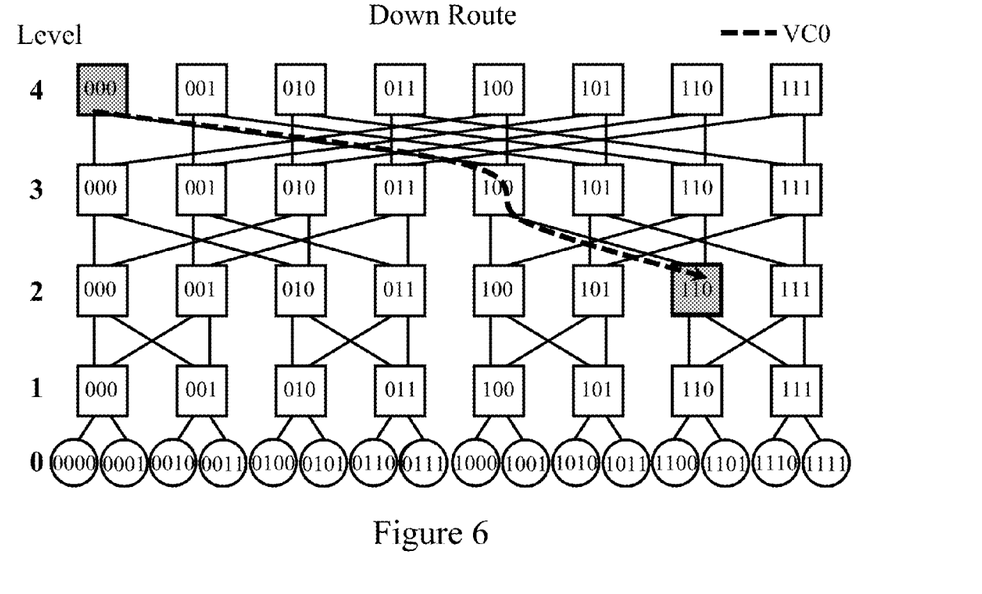
Figure 7:
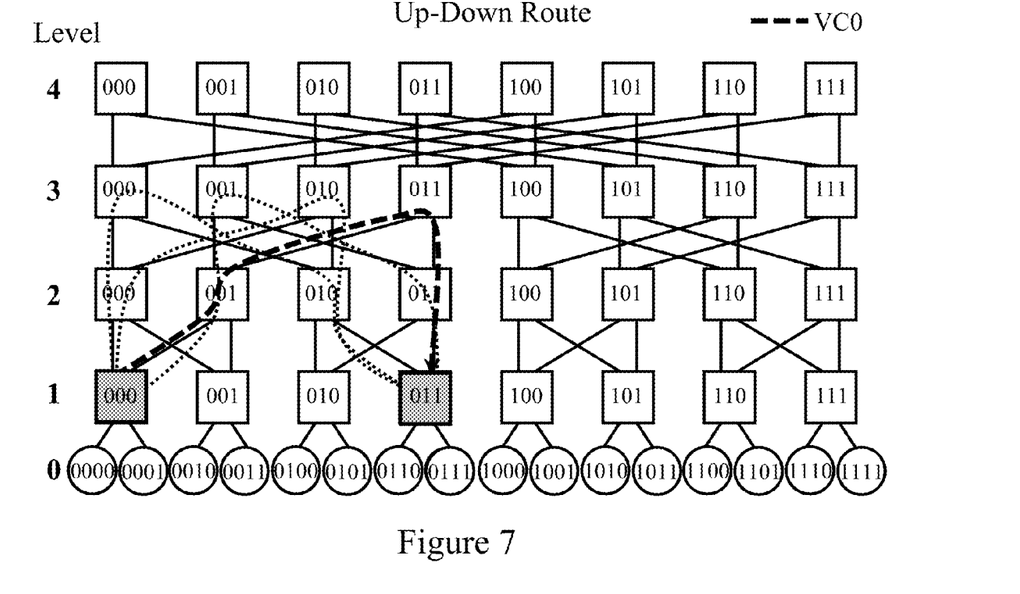
Figure 8:
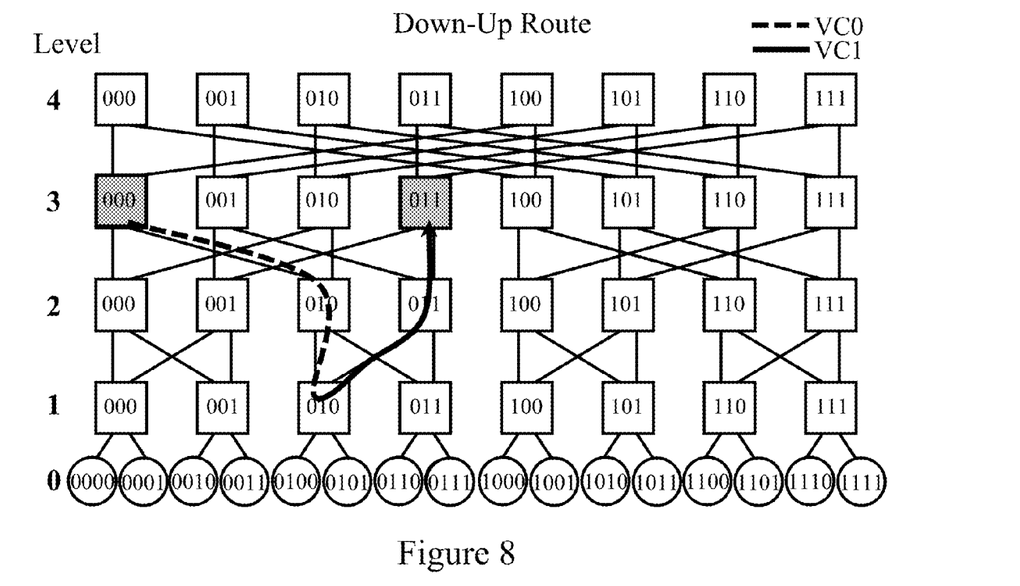
Figure 9:
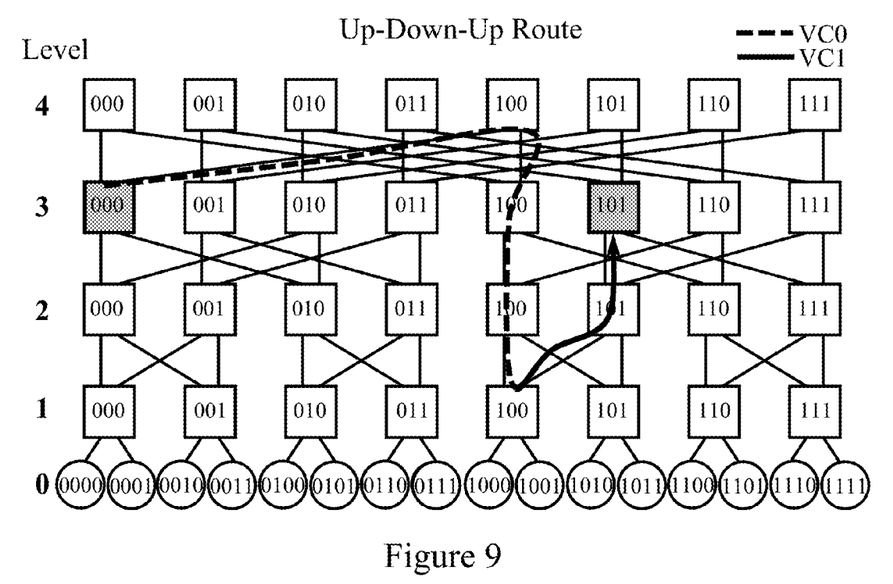
Figure 10:
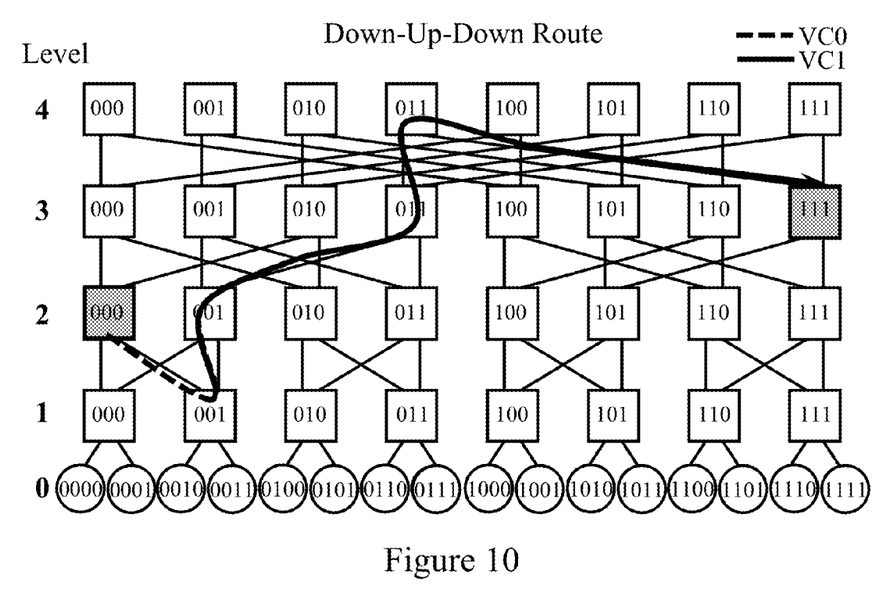

FIGS. 5 to 10 show examples of routes obtained with the above method for each of the six different combinations of routing phases. Routing on VC0 is indicated by dashed route lines and routing on VC1 is indicated by solid route lines. FIGS. 5 and 6 show one-phase up and down routes respectively. In each case the routing method finds the single shortest path to the destination switch and routes on VC0. FIG. 7 illustrates a two-phase up-down route, assigned to VC0. Here there are four alternative shortest paths, via level-3 switches s(3;0xy) where x and y can take either binary value, as indicated by the dotted lines in the figure. The route via s(3;011) is selected by the path selection policy here. FIG. 8 illustrates a two-phase down-up route. This route includes a down/up turn and is therefore assigned to VC0 up to the turning switch s(1;010), and to VC1 from this switch to the destination switch. Here, again there will be four alternative shortest paths, via level-1 switches s(1;0xy), with the route via s(1; 010) being selected in this case. FIG. 9 illustrates a three-phase up-down-up route. In this case there are eight alternative shortest paths, via level-4 switches s(4;x00) and level-1 switches s(1;1yz), where z can also take either binary value. The route via s(4;100) and s(1;100) is selected here. This route includes a down/up turn and is therefore assigned to VC0 up to the turning switch s(1;100), and to VC1 from this switch onwards. FIG. 10 shows a three-phase down-up-down route. Again there are eight alternative shortest paths, via level-1 switches s(1;00x) and level-4 switches s(4;y11), with the route via s(1;001) and s(4;011) being selected. This route also includes a down/up turn and is assigned to VC0 up to turning switch s(1;001), and to VC1 from this switch onwards.

It will be seen that the above embodiment provides a simple and highly efficient routing method for a fully-connected fat tree network 10. By selecting a route having the appropriate combination of three or less routing phases as described, all packets are transmitted via the shortest network path between the source and destination switches. Path diversity can be fully exploited by any desired path selection mechanism, while the virtual channel assignment policy guarantees deadlock-free operation with only two virtual channels.

Methods embodying the invention can be applied in general to any type of fat tree network. The above embodiment, for instance, can be applied to k-ary n-trees generally. Such k-ary n-trees are constructed in a similar manner to network 10, with n.k$^{n-1}$ switches arranged in n stages, (n−1).k$^n$ interswitch links, and k$^n$ end nodes attached to leaf switches. The above embodiment can also be extended in a straightforward manner to extended generalized fat trees (XGFTs) as will be readily apparent to those skilled in the art. XGFTs are characterized by the number of levels n and two parameter vectors mi, wi, where mi is the number of children per level i ($1 \leq i \leq n$, mi$\geq$1), and wi is the number of parents per level ($1 \leq i \leq n$, wi$\geq$1).

Figure 11:
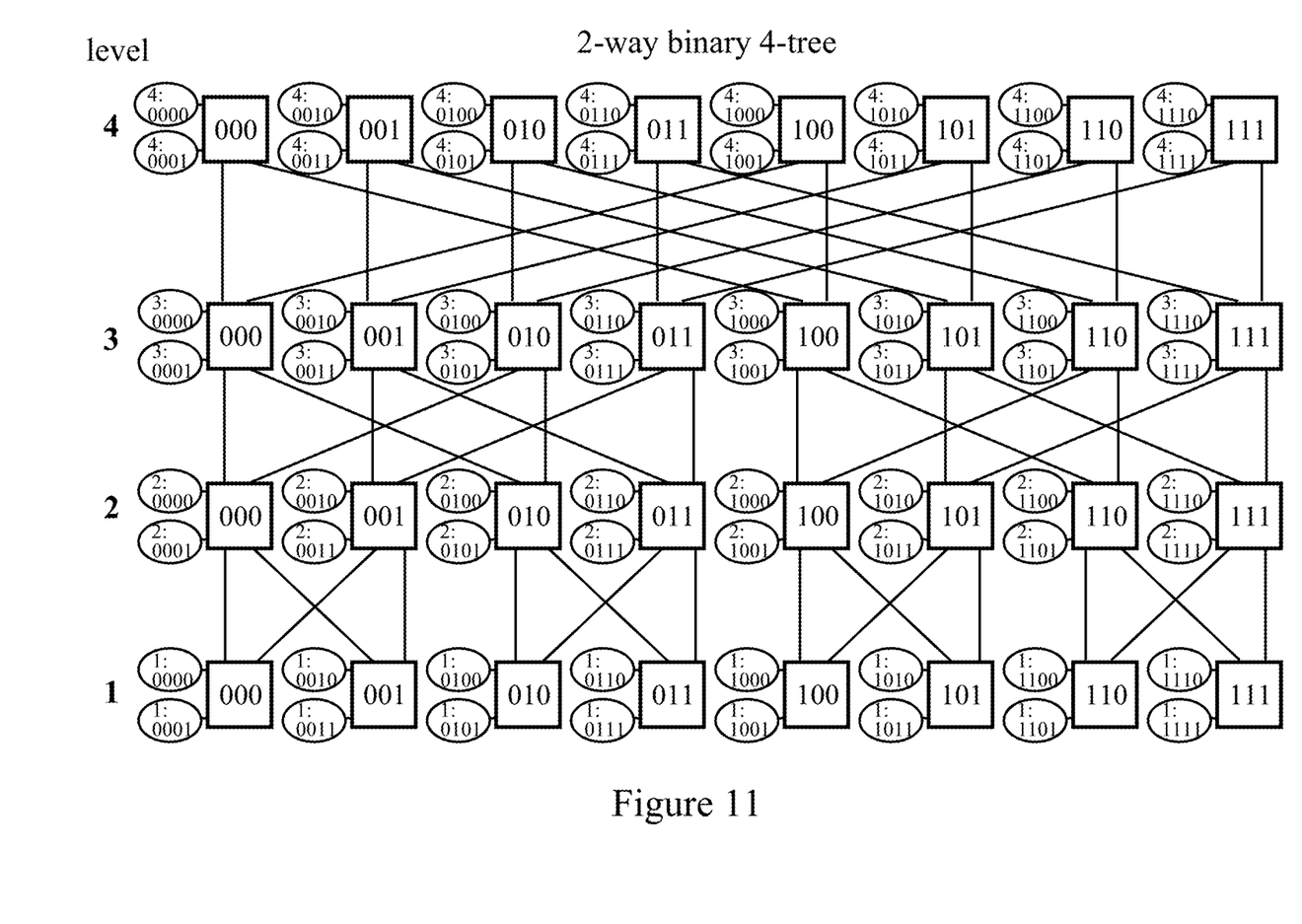
FIG. 11 shows an example of a direct fat tree network embodying the invention.

The switch-to-switch routing technique for fat tree networks also enables an extension of the conventional use of fat tree topologies. In particular, direct fat tree networks can be implemented in which switches in a plurality of levels of the fat tree topology, and preferably each switch in the network, can each be connected to at least one end node. In such a network, switches could be integrated with respective end nodes if desired, or provided separately for connection to a plurality of end nodes. A direct k-ary n-tree, for instance, can be characterized by three parameters (n, k, b) where n and k are as before and b is the bristling factor, i.e. number of end nodes attached to each switch. Such a network has n.k$^{n-1}$ switches and b.n.k$^{n-1}$ end nodes. Switches in the top and bottom levels have radix k+b. All other switches have radix 2.k+b. FIG. 11 illustrates an example of such a network, in this case a 2-way binary 4-tree with b=2. Such a network has: (n−1).k$^n$ interswitch links for n$\geq$2; diameter (number of switches traversed)=2n−1; (k/2).k$^{n-1}$=k$^n$/2 bisection links; bisection bandwidth (unidirectional)=R.k$^n$/2, where R=link rate; bisection bandwidth per node (unidirectional)=(R.k$^n$/2)/(b.n.k$^{n-1}$/2)=(R.k)/(b.n); relative bisection bandwidth per node=k/(b.n). The requirement for full bisection bandwidth is then k$\geq$b.n.

Direct fat tree networks can also be based on XGFTs. Such networks are characterized by the number of levels n and three parameter vectors mi, wi, bi, where: mi is the number of children per level i (here for $2 \leq i \leq n$, mi$\geq$1); wi is the number of parents per level (here for $2 \leq i \leq n$, wi$\geq$1); and bi is the bristling factor (for $1 \leq i \leq n$, bi$\geq$1). Compared to the original XGFT notation: m1 is omitted as the number of children of the first level, i.e. the number of end nodes per first-level switch, is given by bi; and w1 is also omitted as multiple parents per end node are not allowed.

Direct fat tree networks offer various benefits, including shorter average path length and better cost/performance ratio than conventional fat trees. High radix switches can be leveraged for direct topologies, and there is topological flexibility with respect to cost/performance at fixed switch radix k: cost can be reduced by increasing the bristling factor b while performance can be improved by reducing b. Incremental scalability is inherited from direct topologies without forklift upgrades as in typical fat tree networks. Also, better exploitation of locality is possible for a given radix k, according to the number of levels n and the chosen bristling value b.

Direct k-ary n-tree networks embodying the invention may provide per-level bristling factors, giving a network characterized by two parameters (k, n) and one parameter vector bi with $1 \leq bi$ n, bi$\geq$0. This can be used to equalize switch radices at all levels, e.g. for radix 2k+b: b1=b$n$=b+k, b2$\leq$i<n=b, or for radix 2k: b1=b$n$=k, b2$\leq$i<n=0. The latter effectively provides a hybrid direct/indirect fat tree network. Indeed, direct fat tree networks lend themselves well to use in hybrid direct/indirect network forms. In datacentre applications for instance, end nodes may be attached to each switch at board, chassis, and rack levels. These levels could use tightly integrated switches (on the same chip or package as end node CPUs (central processing units)). However, to scale to multiple racks, an interconnection network having one or more conventional indirect levels can be added. These levels could use traditional standalone switches.

Figure 12:
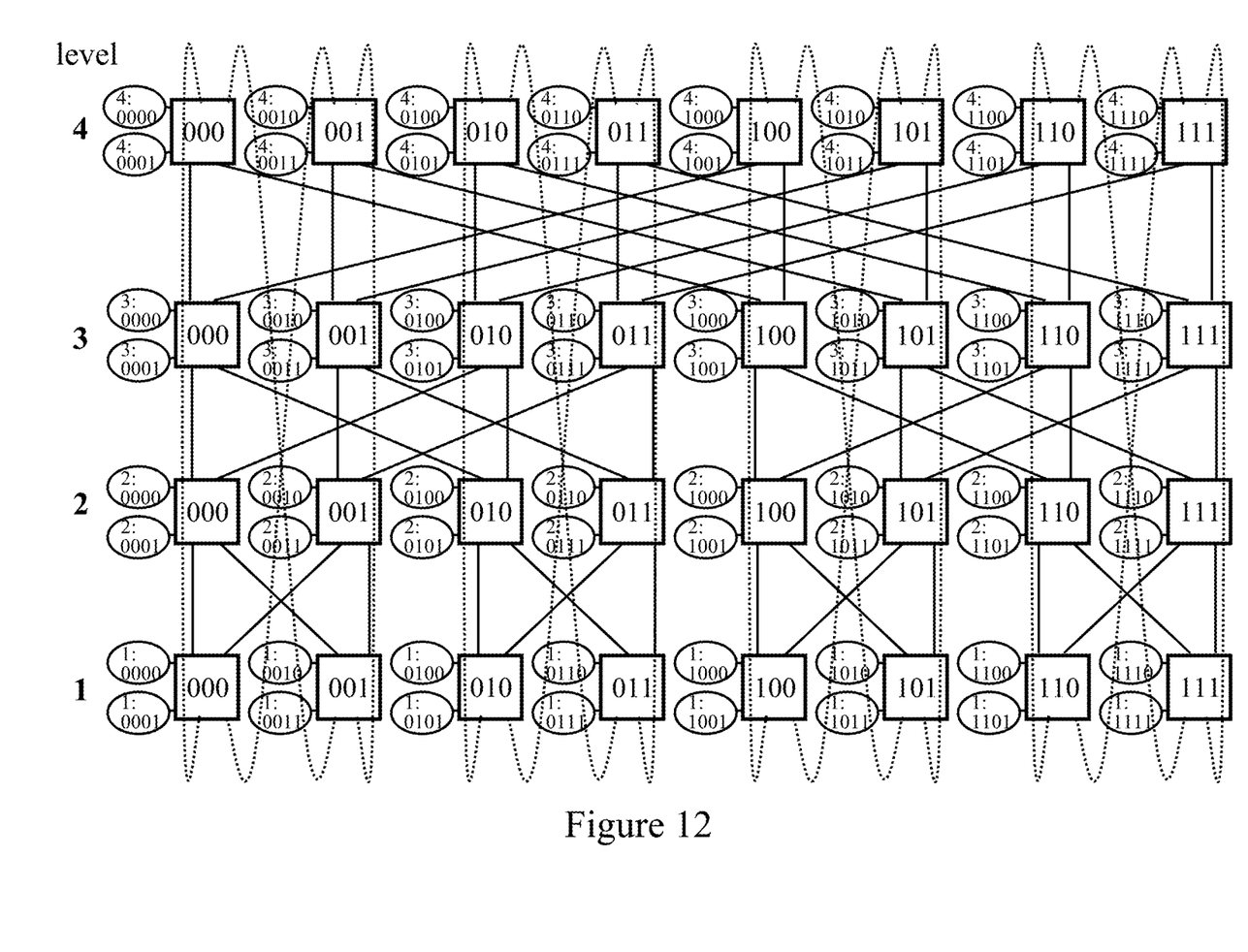
FIG. 12 shows an example of a hybrid direct/indirect network embodying the invention.

One particular embodiment of a hybrid network is illustrated in FIG. 12. This is based on the direct network of FIG. 11 with wrap-around links added from the top to the bottom level. This reduces mean path length and equalizes the switch radix at all levels. Numerous other hybrid network forms will be apparent to those skilled in the art.

It will be appreciated that many changes and modifications can be made to the exemplary embodiments described above. For example, the virtual channel assigned to routes could be changed at the turning switch of routes having an up/down turn as opposed to routes with a down/up turn. Whichever turn triggers change of the virtual channel assignment, routes not containing such a turn could in general be routed on either one of the two channels.

While route calculation and channel assignments are determined dynamically on a hop-by-hop basis above, various alternatives can be envisaged. Routes could be calculated dynamically for a source routing implementation, whereby the source node calculates the entire route which is then specified in the packet in some way. The calculation could also determine and specify channel assignments, or this could be determined dynamically by switches in the route. In other embodiments, route calculation (and if desired also channel assignments) could be done offline in advance of network operation, for instance by a network management computer. In this case, the pre-calculated results for pairs of switches in the network can be defined by one or more data structures, e.g. routing tables, which are provided to switches for use in selecting routes for particular packets during network operation.

Many other changes and modifications can be made to the embodiments described without departing from the scope of the invention.

What is claimed is:

1. A computer-implemented method for routing data packets between source and destination switches in a fat tree network, the method comprising the steps of:
    selecting a route for each packet having three or less routing phases such that the route follows a shortest path across said network between the source and destination switches;
    transmitting the data packet from the source switch to the destination switch, via said route, on one of first and second virtual channels unless the route includes a predetermined one of a down-up turn and an up-down turn; and
    transmitting the data packet, via the route, on the first virtual channel up to the switch at which said turn occurs and on the second virtual channel from that switch if the route includes said predetermined one of a down-up turn and an up-down turn, wherein said predetermined one of a down-up turn and an up-down turn is a down-up turn.

2. The method according to claim 1 further comprising the step of:
    transmitting the data packet on the first virtual channel, if the route does not include said predetermined one of a down-up turn and an up-down turn.

3. The method according to claim 1, further comprising the step of:
    calculating the routes for data packets.

4. The method according to claim 1, further comprising the step of:
    selecting the route for a data packet using predetermined routing data indicating precalculated routes between pairs of switches in the network.

5. The method according to claim 3, further comprising the step of:
    calculating the route for each data packet dynamically in operation of the network.

6. The method according to claim 1, wherein the fat tree network is an indirect fat tree network, and wherein each switch in a lowest level of the topology of the fat tree network is connected to at least one end node.

7. The method according to claim 1, wherein the fat tree network is a direct fat tree network and wherein at least one switch in at least one level of the topology of the direct fat tree network is connected to at least one end node.

8. The method according to claim 1, wherein the fat tree network is a direct fat tree network and wherein each switch in the fat tree network is connected to at least one end node.

9. The method according to claim 1, wherein the fat tree network includes at least one direct fat tree network and at least one interconnection network, and wherein at least one switch in at least one level of the topology of the direct fat tree network is connected to at least one end node.

10. A computer-implemented method for determining routing of data packets between pairs of source and destination switches in a fat tree network, the method comprising the steps of:
    selecting respective routes having three or less routing phases such that each route follows a shortest path across said network between the source and destination switches;
    assigning each route to one of first and second virtual channels from the source switch to the destination switch unless that route includes a predetermined one of a down-up turn and an up-down turn; and
    assigning the route to the first virtual channel up to the switch at which said turn occurs and to the second virtual channel from that switch, if a route includes said predetermined one of a down-up turn and an up-down turn, wherein said predetermined one of a down-up turn and an up-down turn is a down-up turn.

11. A method as claimed in claim 10, further comprising the step of:
    providing routing data, indicating each said route and virtual channel assignment thereof, for use by switches in the network.

12. A computer-implemented method for routing data packets between source and destination switches in a fat tree network, the method comprising the steps of:
    selecting a route for each packet having three or less routing phases such that the route follows a shortest path across said network between the source and destination switches;
    transmitting the data packet from the source switch to the destination switch, via said route, on one of first and second virtual channels unless the route includes a predetermined one of a down-up turn and an up-down turn;
    transmitting the data packet, via the route, on the first virtual channel up to the switch at which said turn occurs and on the second virtual channel from that switch if the route includes said predetermined one of a down-up turn and an up-down turn
    calculating the routes for data packets; and
    calculating the route for a data packet by determining, for each switch on the route, the direction of the routing phase for the next hop and the next switch on the route in that direction.

13. The method according to claim 12, further comprising the step of:

transmitting the data packet on the first virtual channel, if the route does not include said predetermined one of a down-up turn and an up-down turn.

14. The method according to claim 12, further comprising the step of:

determining, for each switch on the route, the virtual channel for the next hop in dependence on said direction.

15. The method according to claim 12, further comprising the step of:

selecting the route for a data packet using predetermined routing data indicating precalculated routes between pairs of switches in the network.

16. The method according to claim 12, further comprising the step of:

calculating the route for each data packet dynamically in operation of the network.

17. The method according to claim 12, wherein the fat tree network is an indirect fat tree network, and wherein each switch in a lowest level of the topology of the fat tree network is connected to at least one end node.

18. The method according to claim 12, wherein the fat tree network is a direct fat tree network and wherein at least one switch in at least one level of the topology of the direct fat tree network is connected to at least one end node.

19. The method according to claim 12, wherein the fat tree network is a direct fat tree network and wherein each switch in the fat tree network is connected to at least one end node.

20. The method according to claim 12, wherein the fat tree network includes at least one direct fat tree network and at least one interconnection network, and wherein at least one switch in at least one level of the topology of the direct fat tree network is connected to at least one end node.

21. A computer-implemented method for routing data packets between source and destination switches in a fat tree network, the method comprising the steps of:

selecting a route for each packet having three or less routing phases such that the route follows a shortest path across said network between the source and destination switches;

transmitting the data packet from the source switch to the destination switch, via said route, on one of first and second virtual channels unless the route includes a predetermined one of a down-up turn and an up-down turn;

transmitting the data packet, via the route, on the first virtual channel up to the switch at which said turn occurs and on the second virtual channel from that switch if the route includes said predetermined one of a down-up turn and an up-down turn;

calculating the routes for data packets;

calculating the route for each data packet dynamically in operation of the network; and calculating the route for each data packet hop-by-hop at successive switches in said path.

22. The method according to claim 21, further comprising the step of:

transmitting the data packet on the first virtual channel, if the route does not include said predetermined one of a down-up turn and an up-down turn.

23. The method according to claim 21, further comprising the step of:

selecting the route for a data packet using predetermined routing data indicating precalculated routes between pairs of switches in the network.

24. The method according to claim 21, wherein the fat tree network is an indirect fat tree network, and wherein each switch in a lowest level of the topology of the fat tree network is connected to at least one end node.

25. The method according to claim 21, wherein the fat tree network is a direct fat tree network and wherein at least one switch in at least one level of the topology of the direct fat tree network is connected to at least one end node.

26. The method according to claim 21, wherein the fat tree network is a direct fat tree network and wherein each switch in the fat tree network is connected to at least one end node.

27. The method according to claim 21, wherein the fat tree network includes at least one direct fat tree network and at least one interconnection network, and wherein at least one switch in at least one level of the topology of the direct fat tree network is connected to at least one end node.

* * * * *